United States Patent
D'Souza et al.

(10) Patent No.: US 8,351,659 B2
(45) Date of Patent: Jan. 8, 2013

(54) EYE DETECTION SYSTEM

(75) Inventors: Clark D'Souza, San Diego, CA (US); Irene Chen, San Diego, CA (US); Shinhak Lee, Valencia, CA (US); Allen E. Ripingill, Jr., Turners Falls, MA (US)

(73) Assignee: Cubic Corporation, San Diego, CA (US)

( * ) Notice: Subject to any disclaimer, the term of this patent is extended or adjusted under 35 U.S.C. 154(b) by 808 days.

(21) Appl. No.: 12/137,435

(22) Filed: Jun. 11, 2008

(65) Prior Publication Data

US 2009/0080712 A1   Mar. 26, 2009

Related U.S. Application Data

(60) Provisional application No. 60/934,732, filed on Jun. 14, 2007.

(51) Int. Cl.
*G06K 9/00* (2006.01)

(52) U.S. Cl. ........ 382/117; 382/103; 382/106; 382/107; 382/115; 382/181; 382/190; 382/191; 382/291; 382/313

(58) Field of Classification Search .......... 382/115–118, 382/100, 103, 106, 107, 181, 190, 191, 291, 382/313
See application file for complete search history.

(56) References Cited

U.S. PATENT DOCUMENTS

| | | | | |
|---|---|---|---|---|
| 5,635,905 | A * | 6/1997 | Blackburn et al. | 340/555 |
| 6,359,560 | B1 * | 3/2002 | Budge et al. | 340/541 |
| 2005/0012817 | A1 | 1/2005 | Hampapur et al. | |
| 2006/0055786 | A1 * | 3/2006 | Ollila | 348/207.99 |
| 2006/0234191 | A1 * | 10/2006 | Ludman | 434/11 |
| 2007/0003113 | A1 | 1/2007 | Goldberg | |
| 2008/0069411 | A1 * | 3/2008 | Friedman et al. | 382/118 |
| 2009/0223072 | A1 * | 9/2009 | Morin et al. | 33/263 |

FOREIGN PATENT DOCUMENTS

WO   WO 00/39760   7/2000
WO   WO 2005/008567 A1   1/2005

OTHER PUBLICATIONS

Hampapur, A. et al., "Smart surveillance: applications, technologies and implications," Information, Communications and Signal Processing, 2003 and Fourth Pacific Rim Conference on Multimedia. Proceedings of the 2003 Joint Conference of the Fourth International Conference on Singapore, Dec. 15-18, 2003, Piscataway, NJ, USA, IEEE, pp. 1133-1138, XP010702808, ISBN: 978-0-7803-8185-8 abstract.

* cited by examiner

*Primary Examiner* — Wesley Tucker
(74) *Attorney, Agent, or Firm* — Kilpatrick Townsend & Stockton LLP

(57) ABSTRACT

An eye detection system, method, and apparatus are disclosed. The eye detection apparatus includes illuminator, receiver, processor, and memory elements. The illuminator emits radiation at predetermined wavelengths from the eye detection apparatus toward an area of interest. Radiation from the area of interest is detected at the receiver which, in turn, provides sensor data to the processor. The processor is coupled to the illuminator and receiver and controls their respective operations. The processor detects a pattern representative of a human eye in the sensor data and determines coordinates of an object corresponding to the pattern. The memory stores the coordinates of the object. Optionally, the eye detection apparatus communicates the coordinates of the object to a wireless device and directs countermeasures to the object's coordinates in response to commands from the wireless device.

28 Claims, 6 Drawing Sheets

EYE DETECTION SYSTEM

CROSS-REFERENCES TO RELATED APPLICATIONS

This application claims the benefit of and is a non-provisional of U.S. Provisional Application Ser. No. 60/934,732 filed on Jun. 14, 2007, which is assigned to the assignee hereof and incorporated herein by reference for all purposes.

BACKGROUND OF THE INVENTION

Law enforcement and military personnel confront dangerous situations in the course of performing their duties. In many cases, such situations involve locating a person who may be operating in a particular area of interest. For example, military personnel may be fired upon by an enemy sniper hiding in the surrounding area. Law enforcement officials, on the other hand, may need to detect persons of interest in an area that is being kept under surveillance.

Conventionally, these activities require considerable time and effort. A soldier, for example, may need to scan the surrounding area with binoculars in an effort to locate the sniper. However, in doing so, he or she may be exposed to considerable risk of harm. Law enforcement officials, such as border agents, may need to keep an area under observation for long periods of time and may risk missing a suspect if they are interrupted or distracted by other tasks.

BRIEF SUMMARY OF EMBODIMENTS

An eye detection system, method, and apparatus are disclosed. The eye detection apparatus includes illuminator, receiver, processor, and memory elements. The illuminator emits radiation at predetermined wavelengths from the eye detection apparatus toward an area of interest. Radiation from the area of interest is detected at the receiver which, in turn, provides sensor data to the processor. The processor is coupled to the illuminator and receiver and controls their respective operations. The processor detects a pattern representative of a human eye in the sensor data and determines coordinates of an object corresponding to the pattern. The memory stores the coordinates of the object. Optionally, the eye detection apparatus communicates the coordinates of the object to a wireless device and directs countermeasures to the object's coordinates in response to commands from the wireless device.

In one embodiment, the eye detection apparatus includes an infrared laser for illuminating an area of interest and the receiver includes one or more photodetecting elements which are sensitive to the wavelengths of the illuminating radiation. The wavelengths of the illuminating radiation can be determined in accordance with characteristics of the receiver and a range of the eye detection apparatus. In an exemplary embodiment, the illuminator emits radiation at wavelengths of approximately 976 nm and the receiver includes a hybrid CMOS camera.

In another embodiment, the eye detection apparatus includes a moveable base. The illuminator, receiver, processor, and memory are joined to a housing and the housing is mounted to the base. The base moves to adjust the position of the housing in response to signals from the processor. The processor updates the coordinates of the object based upon representations from the receiver and causes the base to adjust the position of the housing in relation to the updated coordinates of the object. In this way, the eye detection apparatus automatically tracks the movement of the object.

In still another embodiment, the eye detection apparatus includes a video capture device. The video capture device is coupled to the processor and configured to capture one or more video or still images of the object at the coordinates. The memory is further configured to store information relating to the object including a time of observation and at least one of the video or still images. Also, the processor can include a third module for identifying the object based upon facial recognition processing of the video/still images.

In a further embodiment, the eye detection apparatus includes a communication interface coupled to the processor for exchanging input/output data with a wireless device. The input data can include commands for controlling operation of the eye detection apparatus and the output data can include the coordinates of the object. Thus, the eye detection apparatus can receive commands and data from a remote device and can send operational data to the remote devices over a wireless communication channel.

In another embodiment, the eye detection apparatus directs one or more countermeasures to the coordinates of the object. The eye detector apparatus can include a combat identification system transceiver coupled to the processor and configured to provide an indication of whether the object at the coordinates is a friend or foe. Also, the eye detection apparatus can include an infrared aiming laser coupled to the processor. The processor directs the infrared aiming laser to the coordinates of the object to designate it as a target for air or ground attacks. Also, the processor can be coupled to a weapon system and can provide the coordinates of the object to the weapon system.

In one embodiment, a method of eye detection is disclosed. The method includes illuminating an outdoor area with radiation having predetermined wavelengths outside of a visible range, receiving a reflection of the predetermined wavelengths at a sensor device, and detecting a pattern representative of a human eye in the reflection. The method also includes determining a distance to an object corresponding to the pattern and determining coordinates of the object based upon the distance and the relative position of the pattern in the reflection. The method includes communicating the coordinates to a wireless device.

In another embodiment, the method includes receiving a command from the wireless device and implementing at least one countermeasure in response to the command using the coordinates of the object. The method can include determining a status of the object as friend or foe using a combat identification system, capturing one or more video/still images of the object, targeting the object with a dazzler laser for temporarily blinding a human eye, or designating the object as a target by illuminating it with an infrared sighting laser.

In one embodiment, a battery-powered eye detection apparatus adapted for field use is disclosed. The apparatus includes an infrared illuminator configured to emit radiation at predetermined wavelengths from the eye detection apparatus, and a photodetector configured to detect radiation entering the eye detection apparatus at the predetermined wavelengths and to provide sensor data corresponding to the radiation detected. The apparatus also includes a processor coupled to the infrared illuminator and the photodetector which has a first module for detecting an eye pattern in the sensor data and a second module for determining coordinates of an object corresponding to the eye pattern. The apparatus also includes a video capture device coupled to a processor for capturing one or more images of the object at the coordinates, and a wireless interface coupled to the processor. The wireless interface receives commands and data from a remote device and communicates information about the object, including the coordinates and one or more of the video images, to the remote device.

Further areas of applicability of the present invention will become apparent from the detailed description provided hereinafter. It will be understood that the detailed description and specific examples, while indicating various embodiments of the invention, are intended for purposes of illustration only and do not strictly limit the scope of the invention.

DETAILED DESCRIPTION OF EMBODIMENTS

Figure 1A:
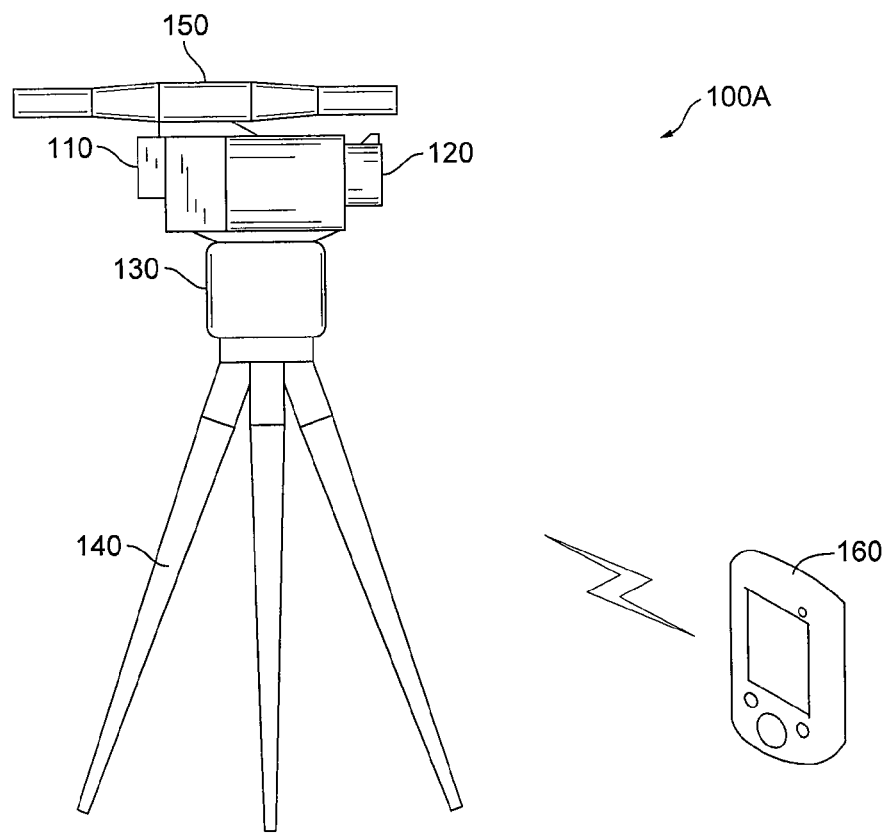
FIG. 1A is a block diagram of an eye detection system according to one embodiment of the present invention.
Figure 1B:
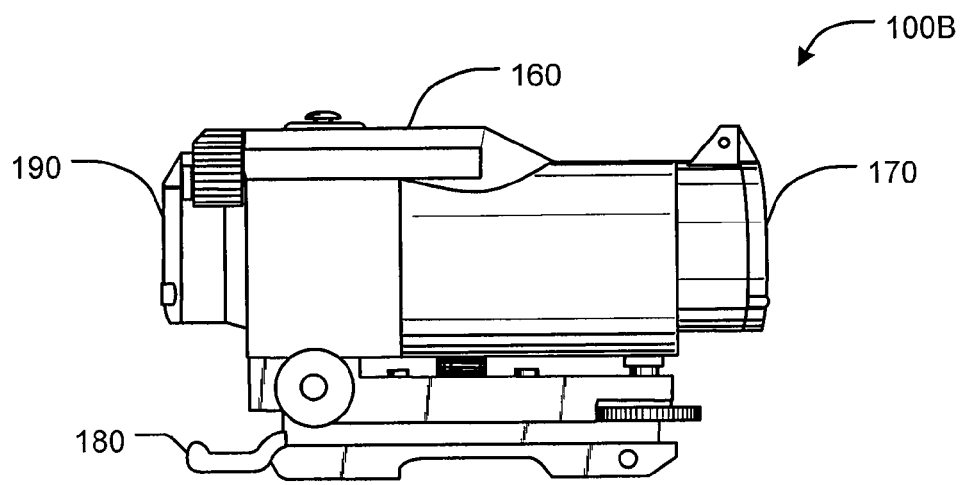
FIG. 1B shows a further embodiment of an eye detection system in accordance with the present invention.

FIGS. 1A-1B show exemplary embodiments of an eye detection system 100 according to the present invention. In a first embodiment, eye detection system 100A includes a housing 110 mounted to base 130. Control elements in housing 110 (not shown) emit electromagnetic radiation into the environment through aperture 120 and receive radiation back from the environment through aperture 120. By illuminating an area with radiation, receiving radiation returned from the area, and detecting characteristic information in the received radiation, eye detection system 100A locates and identifies human beings in an area of interest.

Base 130 facilitates movement of housing 110 in the horizontal and vertical directions. In some embodiments, base 130 is motorized and can pan and tilt its position in response to signals from the control elements in housing 110. Base 130 thus enables eye detection system 100A to actively scan and track target objects. A particular region can be scanned by repeatedly panning aperture 120 over an area of interest. When a subject is located by detecting reflections from his/her eyes, the subject's movement can be tracked by adjusting the position of base 130 so that the individual remains in the field of view. As shown, base 130 is mounted on tripod 140. However, many mounting arrangements are possible. For example, base 130 can be attached to a vehicle or to a stationary object.

Eye detection system 100A communicates with control unit 160. Control unit 160 can be, for example, a personal digital assistant, laptop computer, smartphone, or like device capable of sending and receiving signals over a wired or wireless communication channel. As shown, control unit 160 communicates wirelessly with control elements disposed in housing 110 to exchange commands and data relating to the operation of eye detection system 100A. For example, control unit 160 can select a region to scan, select an individual for tracking, receive coordinates and other information about the individual, and implement countermeasures.

Countermeasures 150 can include a number of devices included with eye detection system 100A. In one military application, countermeasures 150 include a laser dazzler. For example, eye detection system 100A may be used to detect the presence of enemy combatants in a hostile area. Once enemy combatants are detected, eye detection system 100A determines their coordinates and transmits them along with other identifying information such as photographs or video images to controller 160. A soldier operating control unit 160 can determine if countermeasures 150 should be implemented and, if so, which countermeasures 150 are appropriate. Thus, in response to signals from control unit 160, a dazzler laser countermeasure 150 may be directed to the enemy combatant's coordinates and used to cause temporary blindness. Many other countermeasures 150 are possible within the scope of the present invention.

FIG. 1B shows a weapon-mounted embodiment 100B of an eye detection system according to the present invention. Eye detection system 100B includes mount 180 by which it can be secured to a weapon system such as a rifle. Illuminating radiation is passed through aperture 170 in the direction that the rifle is pointing. Aperture 170 also permits return radiation to be received into housing 160. Control elements located in or around housing 160 process the received radiation and detect information characteristic of a human eye or eyes. This information is then presented to a user through aperture 190. For example, eye detection system 100B may be combined with a weapon sight such that, when human eyes are detected, a visual alert is provided in the field of view and/or a warning sound is generated. Coordinates of the detected individual may then be presented in the field of view.

Eye detection system 100B is maneuvered with the weapon to which it is mounted and may include one or more countermeasures. For example, eye detection system 100B may be used by a scout to detect the presence of hostile elements in a particular area. When an enemy combatant is located and its coordinates are determined, the scout can implement countermeasures through eye detection system 100B such as an aiming laser or target designator. Thus, the scout can illuminate the enemy's coordinates with a target designator to facilitate air or ground strikes. Similarly, the scout can communicate coordinates obtained using eye detection system 100B to a control terminal for further intelligence gathering.

Figure 2:
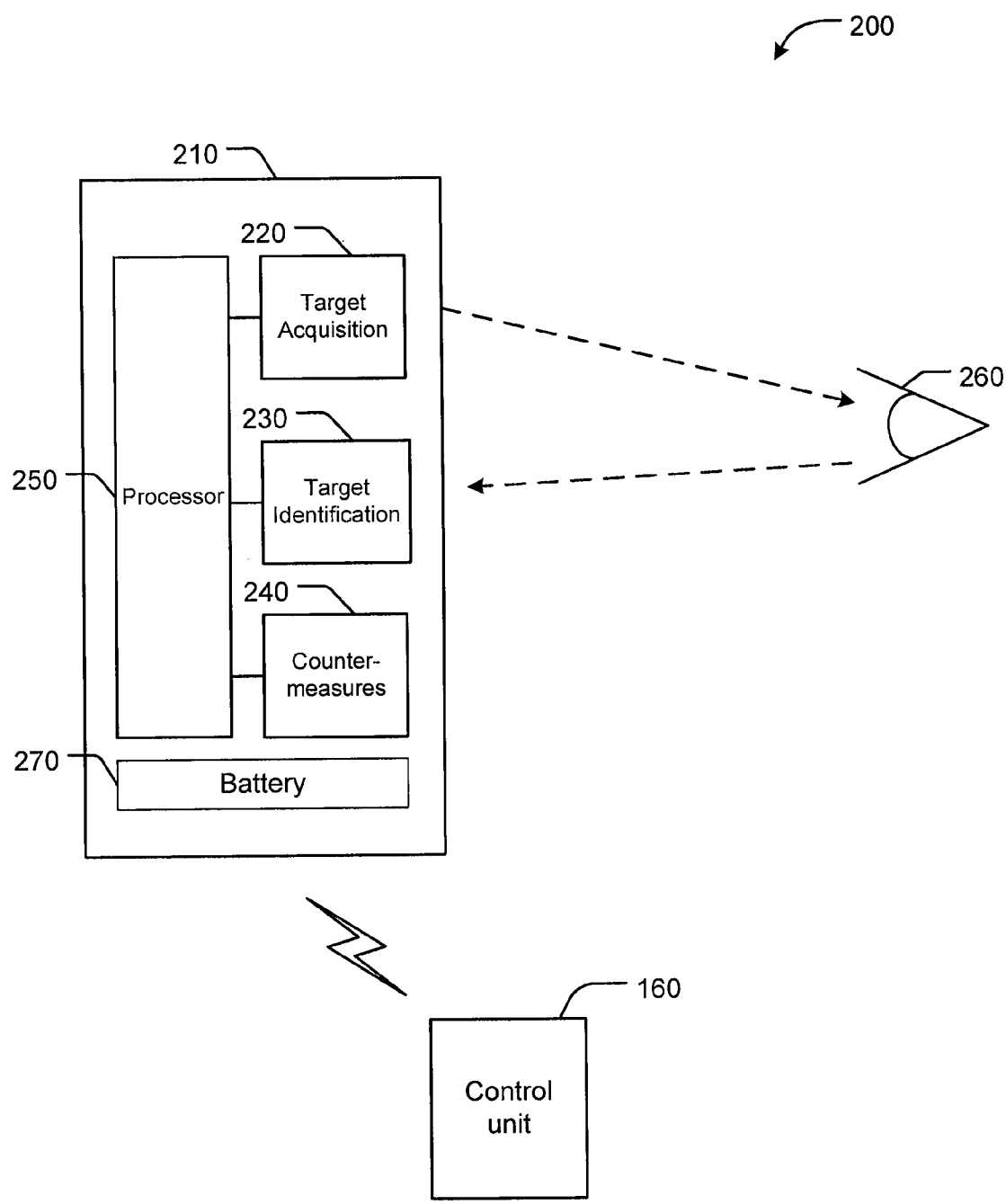
FIG. 2 is a schematic view of an eye detection system in accordance with embodiments of the present invention.

FIG. 2 is a schematic view of an eye detection system 200 according to one embodiment of the present invention. Eye detection system 200 can be, for example, as shown in FIGS. 1A-1B. The elements of detection apparatus 210 are divided into functional groups and include target acquisition elements 220, target identification elements 230, and countermeasure elements 240. Processor 250 is coupled to each group of elements 220-240 for controlling its respective operations. Battery 270 supplies electrical power to the various elements of eye detection system 200 such that it can be used in the field and does not require an external power source.

Target acquisition elements 220 illuminate an area with radiation. Radiation at predetermined wavelengths is emitted from detection apparatus 210 toward the area of interest. In one embodiment, an infrared laser having a wavelength of approximately 976 nm is used to illuminate the area of interest. Objects in the illuminated area reflect the radiation back to detection apparatus 210 in different amounts. Target acquisition elements 220 receive radiation from the environment of detection apparatus 210 and can determine a distance to the objects from which the radiation is reflected. In an exemplary embodiment, target acquisition elements 220 include a camera that is sensitive to both radiation at the illuminating wavelengths and visible radiation. Target acquisition elements 220 produce a sensor representation of objects in the illuminated area and deliver it to processor 250.

Target identification elements 230 can include a laser rangefinder or similar device for determining a distance to objects in the area of interest. For example, processor 250 can use a timing circuit to measure an elapsed time between sending a laser pulse from the laser range finder and detecting its reflection at eye detection apparatus 210. Using the distance measurement, processor 250 analyzes the sensor representation from target acquisition elements 220 and detects eye recognition patterns therein.

The eye recognition patterns can include one or more indicators that are characteristic of the human eye reflecting radiation at the illuminating wavelengths at the specified range. For example, the human eye 260 (hereinafter also "object" and "person") reflects approximately 10% of incident light at wavelengths near 976 nm through a process known as retro-reflection. This reflection can be detected in the sensor representation as a pattern having a particular size, shape, and intensity. Processor 250 analyzes the representation received from target acquisition elements 220 and discriminates between the eye-recognition patterns and other objects which may be present in the environment.

If the eye-recognition pattern is detected, processor 250 determines a position of the object 260 corresponding to the pattern. This can be accomplished by using the ranging data from target identification elements 230 and information about the area that is being illuminated. For example, processor 250 locates coordinates for object 260 within the area that is being illuminated either as absolute coordinates such as longitude and latitude, or as coordinates relative to a grid or other mapping system, for the object. Thus, processor 250 first detects an eye-recognition pattern in the sensor representation and then determines the coordinates of the person 260 detected.

Target identification elements 230 gather additional information about the object. In one embodiment, target identification element 230 includes a video capture device for photographing or video recording the object. For example, in response to signals from control unit 160, processor 250 may cause a camera to begin photographing or video recording activity at the object's coordinates. These images may be stored within eye detection apparatus 210 and may be communicated to control unit 160. In one embodiment, eye detection apparatus 210 includes facial recognition software for analyzing images of the object. Thus, when object 260 has been detected, eye detection apparatus 210 can perform facial recognition processing on the images captured by target identification element 230. The results of the facial recognition processing can be stored at eye detection apparatus 210 and, for example, used to query a local facial recognition database. Alternatively, detection apparatus 210 may simply communicate images or other facial recognition data to control unit 160 for external searching.

Countermeasure elements 240 are controlled by processor 250 and may be used once an individual has been detected and his/her location has been determined. Generally speaking, processor 250 directs countermeasures 240 to the coordinates of the individual detected. By way of illustration, processor 250 may direct a laser designator to the individual's 260 coordinates and/or may target the individual 260 at the coordinates with a dazzler laser or other weapons system. Countermeasures 240 are typically implemented in response to signals from control unit 160. However, in some embodiments, eye detection apparatus 210 automatically implements countermeasures 240 when object 260 is detected.

Figure 3:
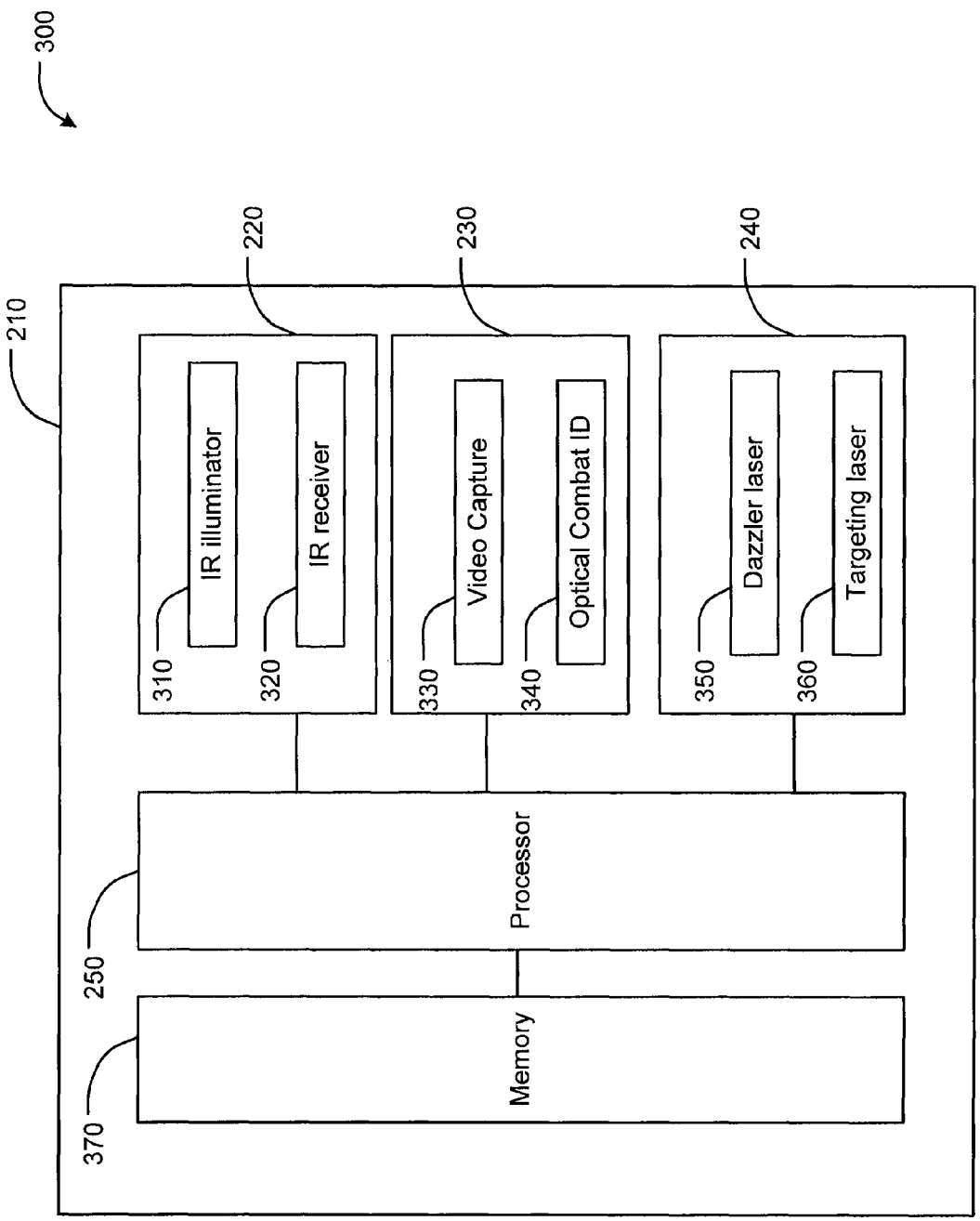
FIG. 3 is a functional block diagram of an exemplary eye detection apparatus according to embodiments of the present invention.

FIG. 3 is a functional block diagram 300 showing detail of eye detection apparatus 210 according to one embodiment of the present invention. IR illuminator 310 can be a variable-power continuous wave (CW) or pulsed infrared laser source. In some embodiments, illuminator 310 includes adaptive optics to control a beam size of the illuminating radiation. Generally, illuminator 310 is selected to be invisible to the human eye and capable of operating within the maximum permissible exposure (MPE) limits promulgated by standards organizations such as the American National Standards Institute (ANSI). Illuminator 310 can include a low-power ("eye safe") operating mode and optionally one or more high-power ("combat") operating modes.

For example, illuminator 310 can be a Class 3b laser device with a wavelength of approximately 976 nm and a nominal ocular hazard distance (NOHD) of about 20 m. An exemplary continuous wave illuminator 310 can have a power output of between 300-500 mW, a beam size of approximately 2.5 cm, and a beam divergence of about 5 mrad. Alternatively, an exemplary pulsed illuminator 320 with similar beam characteristics can have a pulse-rate of approximately 30 Hz and an average power of about 0.5 mW. It will be recognized, however, that the foregoing specifications are provided for illustrative purposes only and do not limit the scope of the present invention. In particular, illuminator 310 can operate at different wavelengths and/or power levels and it is specifically contemplated that these parameters can be varied, for example, to vary the effective range of eye detection apparatus 210.

IR receiver 320 detects radiation received from the area of interest. In various embodiments, IR receiver 320 includes an array of photo-detecting elements sensitive to radiation at the illuminating wavelengths and acts as an infrared camera to create representations of these wavelengths received from the area of interest. For example, an array of silicon (Si), indium gallium arsenide (InGaAs), or hybrid CMOS elements may be used to detect incoming radiation at the illuminating wavelength and to produce voltage-mode or current-mode signals representative of the radiation received from the area of interest. These voltage or current signals can be processed through an analog-to-digital converter (ADC) so that receiver 320 produces a digital representation or mapping of objects in the area of interest as seen with the illuminating radiation. In some embodiments, receiver 320 produces a representation of the objects at both infrared and visible wavelengths.

Figure 4:
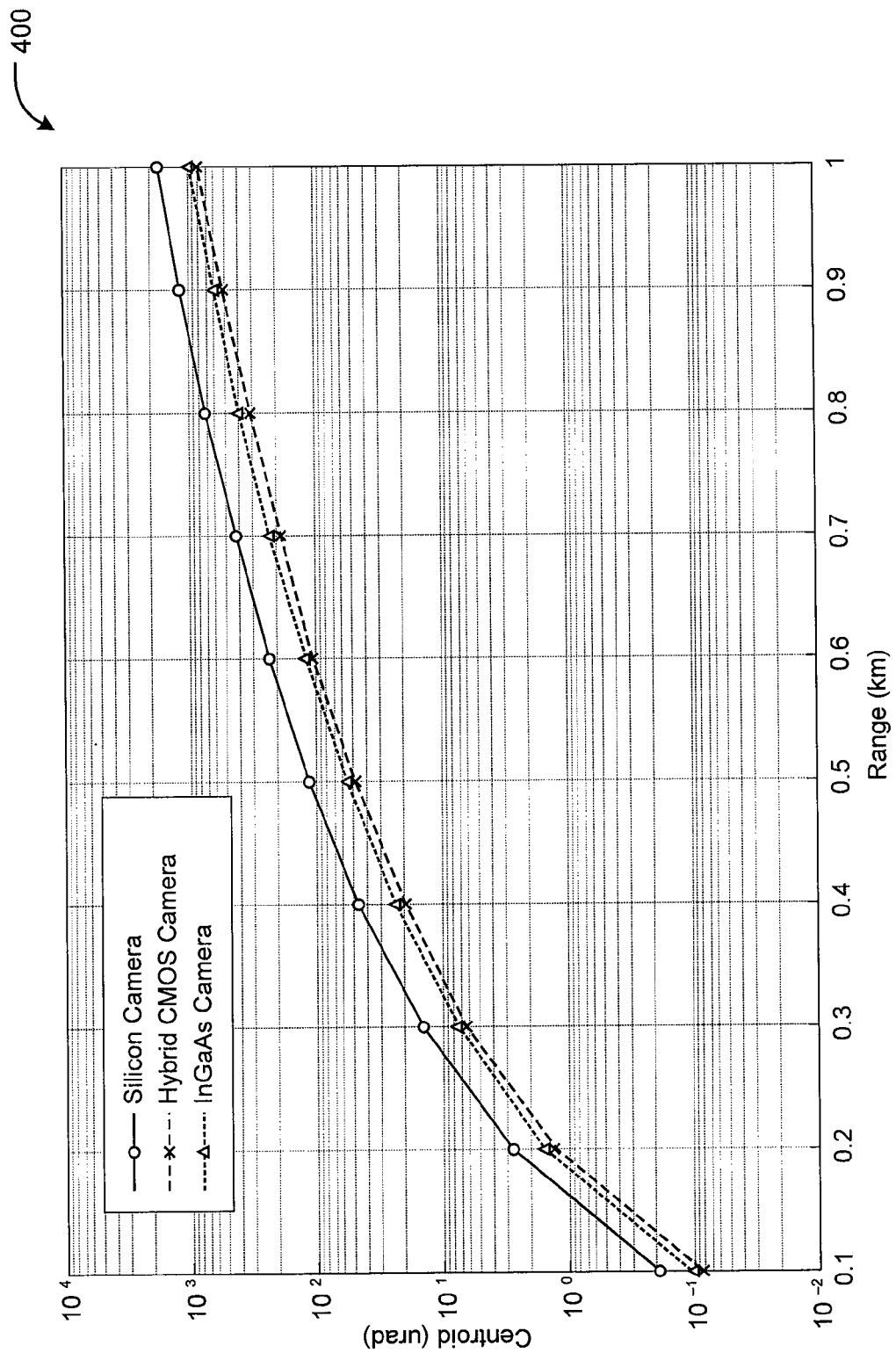
FIG. 4 is a plot showing aspects of exemplary photodetectors which can be used with various embodiments of the present invention.

FIG. 4 is an exemplary plot 400 showing aspects of photodetecting elements such as can be included with receiver 320. For purposes of illustration, a 976 nm continuous wave diode laser is used to illuminate an area of interest. The power level of the test laser is set for eye-safe exposure and the test is conducted by positioning an object representative of a human eye at different distances within an area of interest. The object retro-reflects the illuminating laser and produces a centroid in the sensor representation. The centroid is representative of receiver sensitivity and is measured in microradians (μrad). The distances tested correspond to a range of the eye detection apparatus 210 and vary from approximately 100-1000 meters.

It can be seen from exemplary plot 400 that the hybrid CMOS camera yields the best performance for the specified power level and distances. At each range, the hybrid CMOS camera produces a sensor representation having the smallest centroid and thus potentially the smallest positioning error for the test object. The hybrid CMOS camera is followed closely by the indium gallium arsenide (InGaAs) camera, and then by the silicon (Si) camera. By varying illuminator power, receiver characteristics, and effective range, the operating parameters of eye detection apparatus 210 can be optimized. For example, at eye-safe power levels, a hybrid CMOS camera receiver 320 may be used in combination with a 976 nm illuminating laser 310. However, different illuminator-receiver combinations may be used to achieve increased range and with applications requiring increased power.

Returning to the discussion of FIG. 3, processor 250 receives the sensor representation of objects in the area of interest from IR receiver 320 and detects whether it contains an eye-recognition pattern. As previously mentioned, the sensor representation can include data corresponding to visible wavelengths as well as to the illuminating wavelengths. For example, a silicon camera receiver 320 may produce a sensor representation that includes a photograph of the area under observation superimposed with reflections of the illuminating radiation. Alternatively, receiver 320 may be fitted with one or more wavelength-selective filters so as to produce different sensor representations corresponding to different wavelengths.

If an eye-recognition pattern is detected, processor 250 determines coordinates of the detected object. For example, coordinates for the area under observation may be loaded into eye detection apparatus 210 upon activation or may be acquired from a global positioning system (GPS). As scanning proceeds, processor 250 accesses coordinates for the region under observation. When an object is detected, its relative location within the sensor representation is mapped to coordinates in the region under observation using range information such as can be provided by a laser rangefinder or similar device.

Processor 250 may store the coordinates and information about the object in memory 370. For example, when a person/object is detected, processor 250 may generate a record of the event including the time of observation, coordinates of the object, and the particular eye-recognition pattern matched by the object. Processor 250 may then store the event record in memory 370. In various embodiments, memory 370 can include one or more flash memory elements and/or disk storage elements.

Upon detecting an object, processor 250 may generate an alert or warning signal. In one embodiment, the alert is communicated to a PDA-style control device together with the object's coordinates. At this point, processor 250 can wait for commands from the control device or it can gather additional information about the detected object. For example, processor 250 may begin tracking the object's movement and updating its coordinates. In addition, processor 250 can direct video capture element 330 to begin capturing video or still images of the object at the coordinates. Photographs and/or video recordings of the object may be linked with its event record in memory 370 and may be communicated to the control device. The additional information can provide a further check that the object is in fact a human being.

As a means of identification, eye detection apparatus 210 may interrogate the object using an optical combat identification system (OCIDs). To interrogate the object, processor 250 may direct optical combat identification laser 340 at the object's coordinates. The object may have a tag or other combat identifier capable of modulating the identification laser to indicate that it is friendly. Based upon the OCIDs interrogation, processor 250 evaluates whether the object is friend or foe and can communicate the results of this determination to the control device and/or store the results as part of the event record in memory 370.

Countermeasures 240 include dazzler laser 350 and targeting laser 360. Dazzler laser 350 is a non-lethal countermeasure intended to cause temporary blindness. When an individual has been detected and determined to be a threat, processor 250 directs dazzler laser 350 to its coordinates. For example, in military applications, eye detection apparatus 210 may be used to incapacitate a sniper by directing dazzler laser 350 at the sniper in response to a soldier's command. Targeting laser 360 is designed to illuminate an object for the purpose of facilitating a weapons strike. As with dazzler laser 350, processor 250 directs targeting laser 360 at the coordinates of the object detected by eye detection apparatus 210 and determined to be a threat.

Although described in terms of acquisition, identification, and countermeasure elements, it will be recognized that eye detection system 210 can have a modular design which facilitates changing and/or reconfiguring one or more of its elements. In one embodiment, individual elements can be easily added or removed depending upon application requirements. For example, law enforcement applications may not require targeting laser 360 and thus it can be removed from the set of available countermeasures 240. In its place, additional surveillance-oriented countermeasures such as listening devices may be added. Similarly, in weapons-mounted applications, video capture device 330 may not be required. Rather, in a weapons-mounted application, eye detection apparatus 210 may be combined with other sighting and/or ranging functions to enhance the effectiveness of a particular weapon system. The addition, subtraction, and modification of such elements is specifically contemplated within the scope of the present invention.

Figure 5:
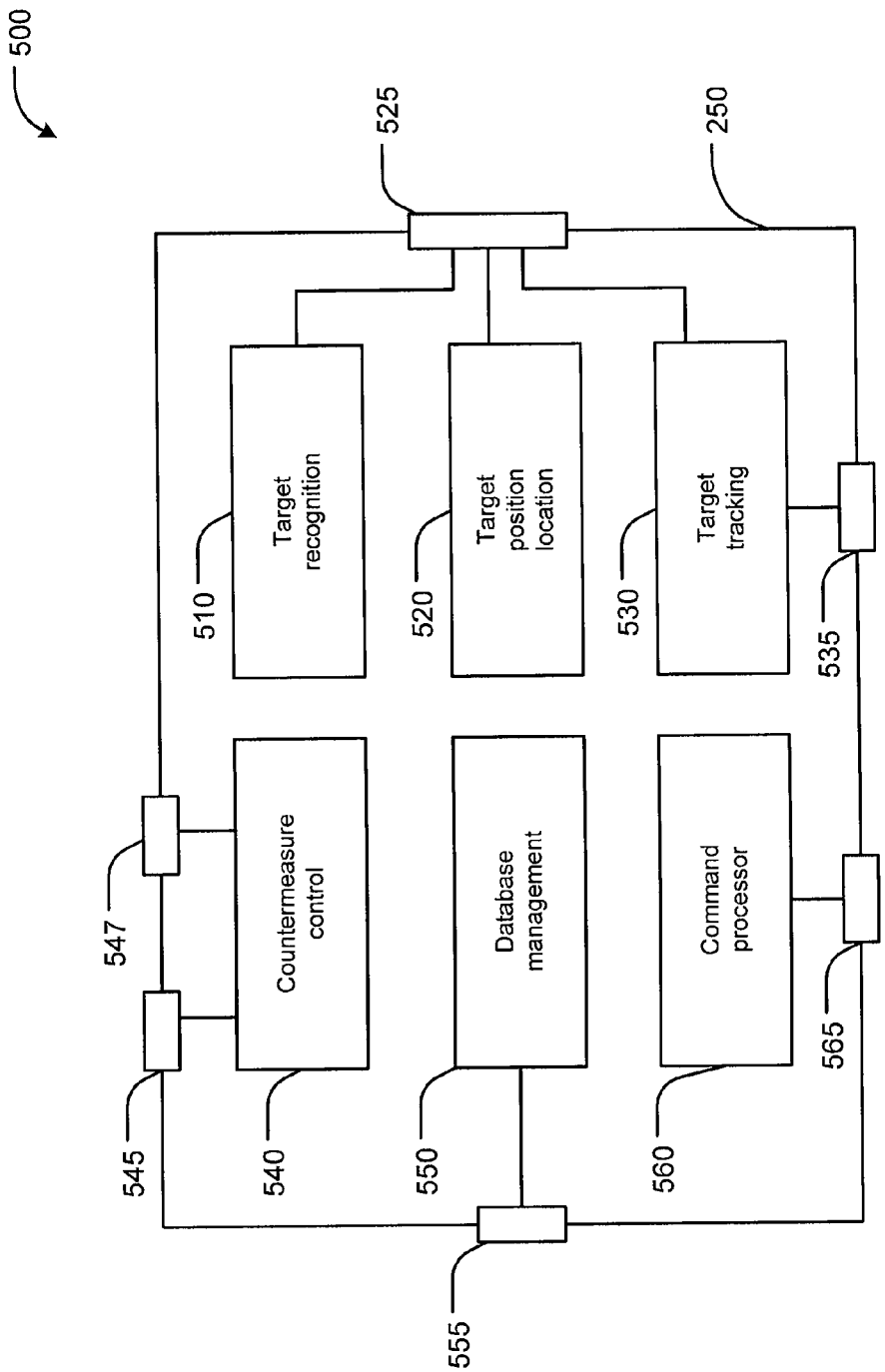
FIG. 5 is a functional block diagram of a processor such as can be used with the eye detection apparatus of FIG. 3.

FIG. 5 is a functional block diagram 500 of a processor 250 such as can be used with embodiments of the present invention. As shown, processor 250 includes various modules and interfaces for controlling the operations of an eye detection system. Processor 250 can include hardware elements as well as a combination of hardware and software. For example, in some embodiments, processor 250 includes one or more microprocessors, application specific integrated circuits (ASICs), and field-programmable gate arrays (FPGAs). Also, processor 250 can include one or more random access or read-only memory elements for storing and retrieving data and program instructions.

Recognition module 510 is coupled to an acquisition interface 525. Recognition module 510 controls the process by which an object is detected in an area of interest. In one embodiment, recognition module 510 activates and deactivates illuminator 310 and receives sensor representations ("sensor data") from IR receiver 320. For example, recognition module 510 may cause eye detection apparatus 210 to begin scanning an area for individuals. As the scan proceeds, recognition module 510 receives digital representations of objects in the area under observation and analyzes the representations to determine if they contain characteristics associated with the human eye.

Several algorithms may be used to detect an eye recognition pattern in the sensor data. For example, a human eye may be detected based upon the size, shape, and intensity of a centroid in the sensor data. This information may be qualified by an estimate of the distance to the particular object such as can be generated by position location module 520. In some cases, recognition module 510 searches for two distinct regions separated by a distance that corresponds to a pair of human eyes. Recognition module 510 may be configured to compare sensor data at different times to detect slight changes in the position or orientation of an eye-detection pattern that are indicative of human movement. For example, a background subtraction process can be used to detect changes in time-ordered sensor data. Using these and other image processing techniques, target recognition module 510 detects an eye-recognition pattern in the sensor data.

Position location module 520 determines coordinates of the object detected by recognition module 510. When an object is detected, recognition module 510 signals its location in the sensor data to position location module 520. In some embodiments, position location module 520 receives input from a laser rangefinder or similar device as to the time delay between illuminating an area and receiving the sensor data corresponding to the detected object. Position location module 520 translates the time delay into a distance estimate. Position location module 520 can then combine the distance estimate, the relative location of the object detected in the sensor data, and the known coordinates of the area under observation to determine coordinates of the object itself. This can involve, for example, positioning algorithms for mapping a centroid detected in the sensor data to its most likely position given distance, optical characteristics of the receiver, atmospheric influences, and other relevant factors. Coordinates for the object can be relative to a grid defining the area under observation or they can be based upon information from a global positioning system (GPS) or similar positioning system.

Position location module 520 may also direct a video camera to the object's coordinates through acquisition interface 525 to begin photographing and/or video recording the object. This can occur either in response to signals from command processor 560 or automatically upon detecting the object and determining its coordinates.

As shown, tracking module 530 is coupled to acquisition interface 525 and pan/tilt interface 535. Tracking module 530 permits the eye detection system to automatically follow changes in an object's movements by adjusting its position. In one embodiment, tracking module 530 receives updated coordinates from position location module 520. These coordinates are translated into adjustments and used to control the position of the eye detection system in relation to movement of the detected object. For example, tracking module 530 may generate azimuth and elevation control signals which are conveyed to a motorized base unit such as base 130 (FIG. 1A). In this way, as the detected object changes position, tracking module 530 causes the eye detection system to follow its movements so that it continues to be detected by recognition module 510. In addition to automated tracking, tracking module 530 can receive movement commands from command processor 560 to facilitate manual positioning of the eye detection system.

Command processor 560 is coupled to control interface 565 and provides a means for receiving instructions and data from an external source. These instructions and data can relate to all operational aspects of the eye detection system. Command processor 560 thus acts as a nerve center and can communicate with all other parts of processor 250. In one embodiment, control interface 565 is a wireless networking adapter capable of exchanging encrypted communications with a remote device such as control unit 160 (FIG. 1A). Alternatively, control interface 565 can support a wired connection as with, for example, an Ethernet adapter or RS-232 serial communication interface.

Database module 550 is coupled to storage interface 555 and manages information collected by the eye detection system. For example, information about an object may include the date, time, and location that an object was detected along with additional information such as photographs or video recordings acquired by position location module 520. Database module 550 organizes and maintains this information in local storage such as a flash memory or magnetic disk device. Database module 550 can access the stored information in response to queries from command processor 560. In addition, database module 550 may be used in connection with facial recognition software to provide comprehensive tracking and identification of individuals. In some embodiments, storage interface 555 is a small-computer system interface (SCSI) or advanced technology attachment (ATA) interface. Alternatively or additionally, storage interface 555 may include a universal serial bus (USB) adapter.

Countermeasure control module 540 is coupled to countermeasure interfaces 545, 547 and directs the use of various countermeasures forming part of the eye detection system. As shown, countermeasure control module 540 is coupled to aiming laser interface 545 and also to dazzler interface 547. In one embodiment, when an object is detected and identified as a threat, command processor 560 causes position location module 520 to supply the object's coordinates to countermeasure control 540.

Command processor 560 also specifies which countermeasure(s) to deploy. In the case of a laser designation countermeasure, countermeasure control module 540 delivers control signals to aiming laser interface 545 which directs a designator to the object's coordinates and activates the laser to illuminate the object for targeting by a weapons system. Command processor 560 may alternatively specify a dazzler laser countermeasure, in which case countermeasure control module 540 directs a dazzler laser to the object's coordinates by generating appropriate control signals at dazzler interface 547. Although shown with two interfaces 545 and 547 it will be recognized that countermeasure control module 540 can include multiple countermeasure interfaces and corresponding device control protocols as part of a modular design.

Figure 6:
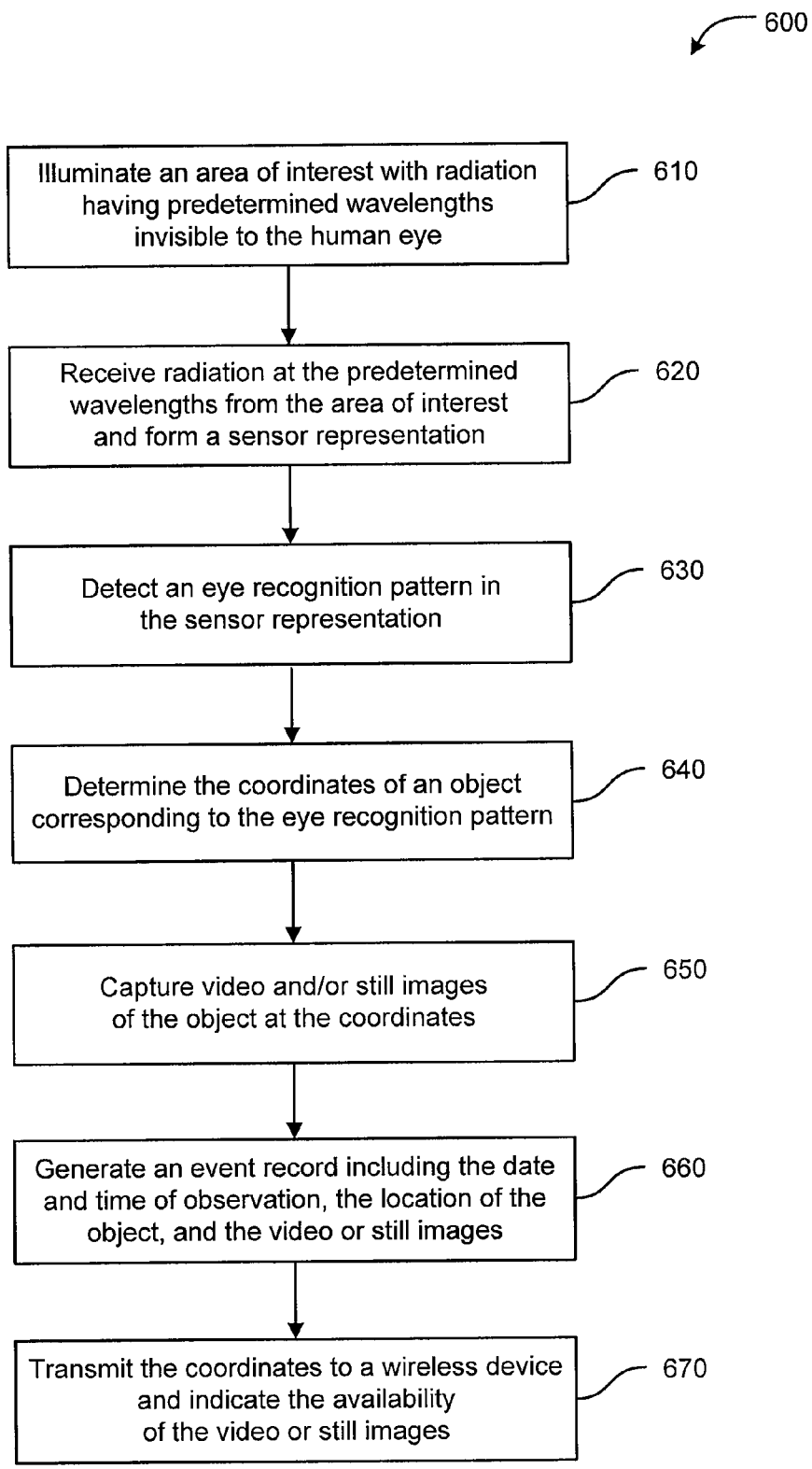
FIG. 6 is a flowchart illustrating a method of eye detection according to an exemplary embodiment of the present invention.

FIG. 6 is a flowchart of an eye detection method 600 according to one embodiment of the present invention. At step 610, an area of interest is illuminated with radiation at predetermined wavelengths. The predetermined wavelengths can be selected based upon properties of the human eye. For example, the illuminating radiation can include infrared wavelengths which are not within the visible spectrum, but which are strongly retro-reflected by the structure of the human eye. One or more laser sources can be used to illuminate the area of interest.

At step 620, radiation at the illuminating wavelengths is received from the area of interest. The radiation can be reflected by objects in the area and received at a photodetector or sensor array which produces a representation thereof. In some embodiments, radiation at visible wavelengths is also received and the sensor representation includes a digital image of the area.

Based upon the sensor representation, at step 630, an eye-recognition pattern is detected. This can involve searching for patterns that are characteristic of the human eye reflecting radiation at the predetermined wavelengths. For example, a human eye can be detected based upon one or more patterns of size, shape, and intensity. If the eye recognition pattern is detected then, at step 640, the coordinates of an object corresponding to the eye-recognition pattern are determined. This can involve estimating distance to the object and its position within the area under observation.

At step 650, video and/or still images of the object at the coordinates are captured. This information may be used to verify that the object is a person and may assist in his/her identification. For example, facial recognition software may be used to analyze a digital image in which the eye detection pattern is detected. The results of facial recognition processing may be used to identify the person in a military or law enforcement database or other collection of images.

An event record is generated with information about the object. For example, at step 660, a record of the date and time of observation, the coordinates at which a person is observed, and video/still images of the person may be stored in a database or information storage device. At step 670, the coordinates are transferred to a wireless device together with an indication of the availability of the video or still images.

The preceding description includes preferred exemplary embodiment(s) only, and is not intended to limit the scope, applicability or configuration of the invention. Rather, the description of the preferred exemplary embodiment(s) will provide those skilled in the art with an enabling description for implementing a preferred exemplary embodiment of the invention. It will be understood that various changes in the function and arrangement of elements are possible without departing from the spirit and scope of the invention as set forth in the appended claims.

Specific details have been given in the description to provide a thorough understanding of the embodiments. However, it will be recognized by one of ordinary skill in the art that the embodiments may be practiced without these specific details. For example, individual circuits may not be shown in block diagrams in order not to obscure the embodiments in unnecessary detail. In other instances, well-known circuits, processes, algorithms, structures, and techniques may be shown without unnecessary detail in order to avoid obscuring the embodiments.

Also, embodiments of the present invention may be implemented by hardware, software, firmware, middleware, microcode, hardware description languages, or any combination thereof. When implemented in software, firmware, middleware or microcode, the program code or code segments to perform the necessary tasks may be stored in a machine readable medium such as storage medium. A processor(s) may perform the necessary tasks. A code segment or machine-executable instructions may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

What is claimed is:

1. An eye detection apparatus comprising:
   an illuminator configured to emit radiation at predetermined wavelengths outside of a visible range, wherein the predetermined wavelengths are retro-reflected by a human eye structure;
   a receiver configured to receive radiation at the predetermined wavelengths that is retro-reflected by the human eye structure, detect radiation at the predetermined wavelengths and produce a digital representation thereof;
   a processor coupled to the illuminator and receiver and configured to detect a pattern representative of a retro-reflection out of a human eye in the digital representation,
   the processor further configured to estimate a distance from the eye detection apparatus to an object corresponding to the pattern, and
   the processor configured to determine coordinates of the object based upon the digital representation, coordinates of the eye detection apparatus, and the estimated distance, wherein the coordinates of the object include at least one of:
   coordinates in relation to a mapping system, or
   absolute coordinates;
   a video capture device coupled to the processor and configured to capture one or more video or still images of the object at the coordinates, after the pattern is detected, based, at least in part, on the detection of the pattern; and
   a memory configured to store the coordinates of the object.

2. The apparatus of claim 1 further comprising:
   a communication interface coupled to the processor for exchanging input/output data with a wireless device.

3. The apparatus of claim 2 wherein the input data comprises commands for controlling operation of the eye detection apparatus and the output data comprises the coordinates of the object.

4. The apparatus of claim 1 wherein the memory is further configured to store information relating to the object including a time of observation and at least one of the video or still images.

5. The apparatus of claim 1 wherein the processor is further configured to perform facial recognition processing for identifying the object using one or more of the video or still images.

6. The apparatus of claim 1 wherein the illuminator, receiver, processor, and memory are joined to a housing, and wherein the housing is adapted to be mounted on a weapon.

7. The apparatus of claim 1 wherein the illuminator, receiver, processor, and memory are joined to a housing, the apparatus further comprising a motorized base coupled to the housing and configured to adjust a position of the housing in response to signals from the processor.

8. The apparatus of claim 7 wherein the processor updates the coordinates of the object based upon successive representations from the receiver.

9. The apparatus of claim 8 wherein the processor causes the motorized base to adjust the position of the housing in relation to the updated coordinates of the object.

10. The apparatus of claim 1 wherein the wavelengths of the radiation emitted by the illuminator are determined in accordance with a sensitivity of the receiver and an effective range of the eye detection apparatus.

11. The apparatus of claim 1 wherein the illuminator is an infrared laser and the predetermined wavelengths are approximately 976 nm.

12. The apparatus of claim 1 further comprising:
    a combat identification system transceiver coupled to the processor and configured to provide an indication of whether the object at the coordinates is a friend or foe.

13. The apparatus of claim 1 further comprising:
    an infrared aiming laser coupled to the processor, and wherein the processor directs the infrared aiming laser to the coordinates of the object thereby designating the object as a target.

14. The apparatus of claim 1 wherein the processor is coupled to a weapon system and wherein the processor provides the coordinates of the object to the weapon system.

15. The apparatus of claim 1 further comprising:
    a laser device operative to cause temporary blindness in a human eye, wherein the processor directs the laser device to the coordinates of the object.

16. A method of eye detection comprising:
    illuminating an outdoor area with radiation having predetermined wavelengths outside of a visible range, wherein the predetermined wavelengths are retro-reflected by a human eye structure;
receiving a reflection of the predetermined wavelengths at a sensor device, wherein at least a portion of the reflection is a retro-reflection out of a human eye;
detecting a pattern representative of the retro-reflection out of the human eye in the reflection;
determining a distance to an object corresponding to the pattern;
determining coordinates of the object corresponding to the pattern based upon the distance and a relative position of the pattern in the reflection, and coordinates of the sensor device, wherein the coordinates of the object include at least one of:
coordinates in relation to a mapping system, or absolute coordinates;
capturing one or more video or still images of the object at the coordinates, after the pattern is detected, based, at least in part, on the detection of the pattern; and
communicating the coordinates to a wireless device.

17. The method of claim 16 further comprising:
receiving a command from the wireless device; and
implementing at least one countermeasure in response to the command based on the coordinates of the object.

18. The method of claim 16 further comprising automatically adjusting a position of the sensor device in response to movement of the object.

19. The method of claim 16 further comprising determining a status of the object as friend or foe using a combat identification system and the coordinates.

20. The method of claim 16 further comprising adding information about the object to an information store.

21. The method of claim 16 wherein the information comprises the coordinates, a time of observation, and at least one of the video or still images.

22. The method of claim 16 further comprising communicating the video or still image to a wireless device.

23. The method of claim 16 further comprising:
performing facial recognition processing on one or more of the video or still images to obtain comparison data; and
determining if the comparison data matches entries in a facial recognition database.

24. The method of claim 16 further comprising updating a record in the information store if the comparison data matches the facial recognition data.

25. The method of claim 16 further comprising:
designating the object as a target; and
communicating the coordinates of the object to a weapons system.

26. The method of claim 25 wherein designating the object as a target further comprises illuminating the coordinates of the object with an infrared sighting laser.

27. The method of claim 16 further comprising targeting the object with a counter-measure for temporarily blinding a human eye.

28. A battery-powered eye detection apparatus adapted for field use, the apparatus comprising:
an infrared illuminator configured to emit radiation at predetermined wavelengths from the eye detection apparatus, wherein the predetermined wavelengths are retro-reflected by a human eye structure;
a photodetector configured to receive radiation at the predetermined wavelengths that is retro-reflected by the human eye structure, detect radiation entering the eye detection apparatus at the predetermined wavelengths and provide sensor data corresponding to the detected radiation;
a processor coupled to the infrared illuminator and the photodetector, the processor having a first module for detecting an eye pattern in the sensor data and a second module for determining coordinates of an object corresponding to the eye pattern based on coordinates of the eye detection apparatus, wherein:
the eye pattern is representative of a retro-reflection out of a human eye; and
the coordinates of the object corresponding to the eye pattern include at least one of:
coordinates in relation to a mapping system, or absolute coordinates;
a camera coupled to the processor and configured to capture one or more video or still images of the object at the coordinates of the object corresponding to the eye pattern, after the eye pattern is detected, based on the detection of the eye pattern; and
a wireless interface coupled to the processor for receiving commands and data from a remote device and for communicating information about the object including the coordinates of the object corresponding to the eye pattern and one or more of the video images to the remote device.

* * * * *